Dec. 16, 1930.  H. STANLEY ET AL  1,785,658
VALVE FOR AIR GAUGES
Filed Feb. 7, 1928  2 Sheets-Sheet 1

Inventor
Howard Stanley,
Rufus Stanley,

By Clarence A. O'Brien
Attorney

Dec. 16, 1930.   H. STANLEY ET AL   1,785,658
VALVE FOR AIR GAUGES
Filed Feb. 7, 1928   2 Sheets-Sheet 2
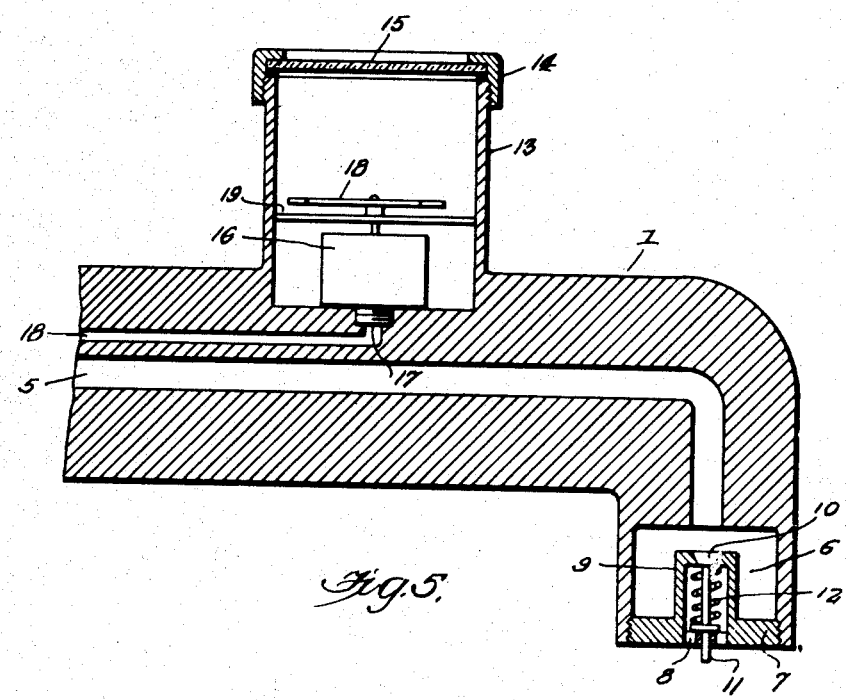
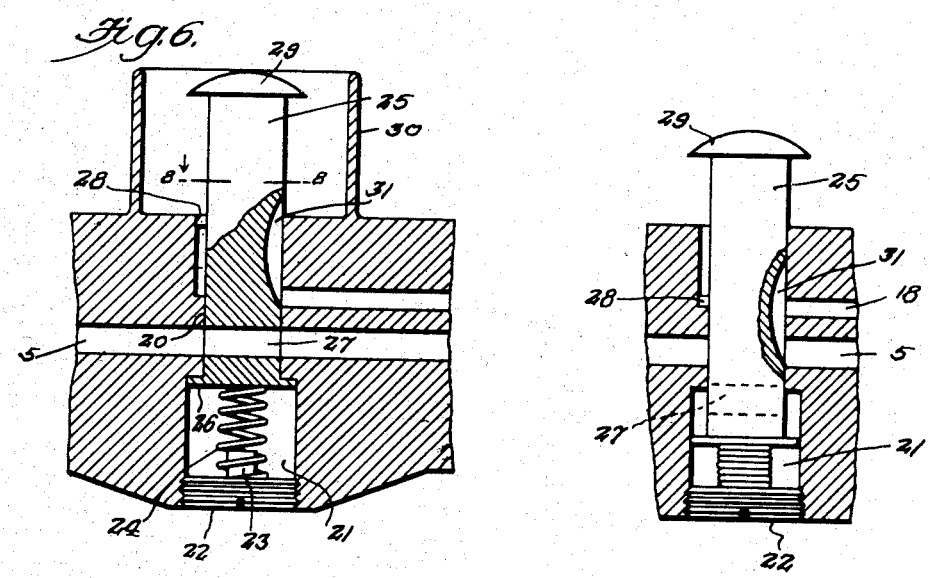
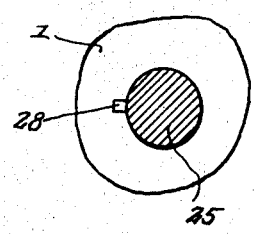
Inventor
Howard Stanley,
Rufus Stanley,
By Clarence A. O'Brien
Attorney Patented Dec. 16, 1930

1,785,658

UNITED STATES PATENT OFFICE

HOWARD STANLEY AND RUFUS STANLEY, OF DUNBAR, WEST VIRGINIA

VALVE FOR AIR GAUGES

Application filed February 7, 1928. Serial No. 252,503.

The present invention relates to improvements in the construction of pneumatic tube inflating nozzles and further pertains to novel means whereby the air pressure within a pneumatic tire may be ascertained during the inflation thereof.

The particular nature of this device involves means whereby the pressure within the pneumatic tire may be tested, without the necessity of removing the inflating nozzle from attachment with the usual tube valve.

One of the several objects of this invention is accomplished by a plunger permitting compressed air in the tire to flow to a gauge carried by the nozzle, through the action of means also operable to exhaust the air from the gauge and simultaneously reopen the air supply line to the nozzle head.

Another important object exists in the particular arrangement of parts, rendering the device extremely convenient in use and easy of operation to produce the several results which will become clearly comprehensible from the specification and claim to follow.

In the drawing:

Figure 5 is an enlarged longitudinal sectional view through a fragmentary portion of the nozzle and disclosing certain novel details of construction.

Figure 6 represents a further enlarged longitudinal sectional view of a fragmentary portion of the nozzle, the same disclosing the reciprocatory plunger in open position.

Figure 7 represents substantially the same view as disclosed in Figure 6, excepting that the plunger is shown in closed position, and Figure 8 represents a sectional view through the plunger, the same being taken on the line 8—8 of Figure 6.

Figure 1:
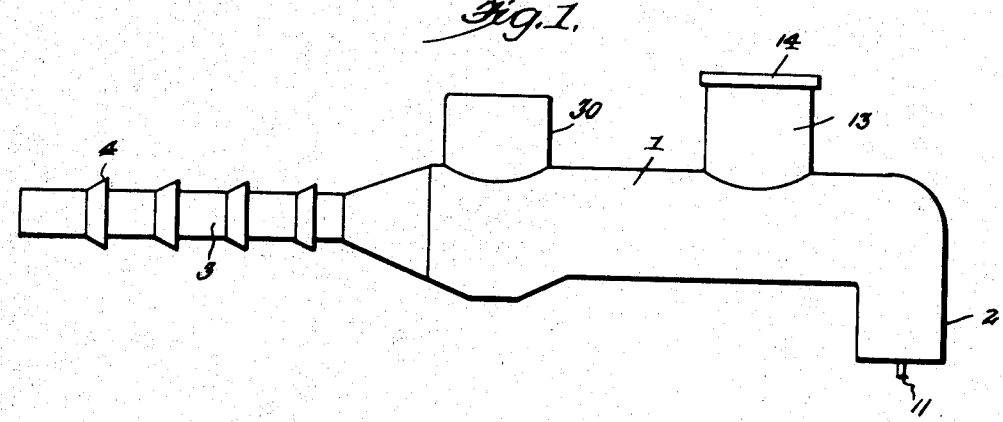
Figure 1 represents the side elevation of the nozzle in its entirety.
Figure 2:
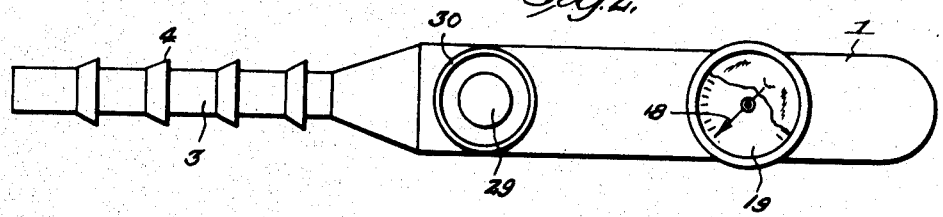
Figure 2 represents the top view of the device as represented in Figure 1.
Figures 3, 4:
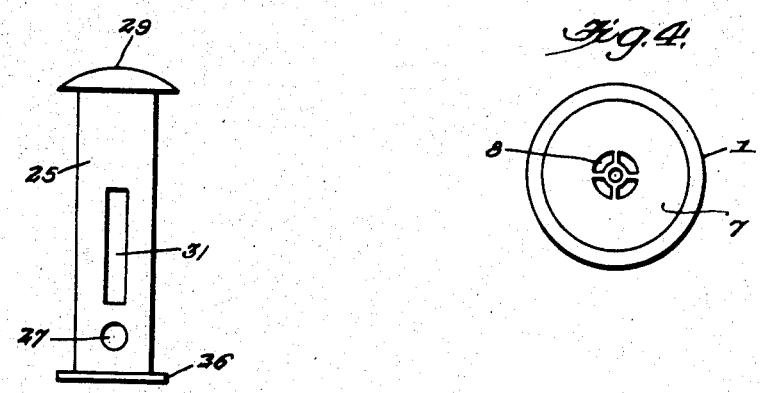
Figure 3 represents a side elevation of the plunger employed for controlling the several functions of the nozzle.
Figure 4 represents a face view on the nozzle head disclosing the same with the valve member removed.

Reference is made to the drawings wherein like numerals designate like parts. The invention includes an elongated nozzle, preferably of metal, as usual, and which has its head portion 2 bent at substantially right angles to its body proper. The opposite end of this nozzle is reduced as at 3 and provided with a plurality of bevelled ribs 4 of usual construction, for the obvious purpose of retaining the flexible hose stretched thereover. The bore 5 is formed centrally through the nozzle throughout its longitudinal length and communicates with an enlarged opening 6 in the head 2. The head 2 is internally threaded at its end portion to receive the threaded plug 7, which plug is formed centrally with an opening 8, and an inwardly disposed spider 9. The inner end of this spider is formed with a valve seat, in which the valve head 10 is seatable, while the valve stem 11 thereof has its outer end portion normally projecting beyond the outer face of the plug 7. The coiled spring 12 is disposed around the stem and is adapted to normally maintain the valve closed.

At the top side of the nozzle and adjacent its forward end an upstanding shell 13 is provided, and formed at its upper end with threads. An internally threaded rim 14 is adapted to be threaded to the threaded end of the shell 13 for the purpose of disposing the glass window 15 in the position shown in Figure 5. The gauge 16 of conventional construction is provided with a threaded nipple 17 threadable within the duct 18 which duct extends inwardly in substantially parallel relation to the air supply bore 5. This gauge is provided with the usual indicating hand 18, employed for indicating the pressure affecting the gauge mechanism in respect to the scaled dial 19. Adjacent the inner end of the enlarged portion of the nozzle, the cylinder bore 20 is formed vertically through the nozzle. The lower end portion of this bore is enlarged as at 21, and threaded at its end portion to receive a threaded plug 22. The inner end of this plug is provided with an inwardly projecting pintle 23, adapted to engage within the convolutions of the coiled spring 24.

As clearly shown in Figure 6, the duct 18 terminates at its rear end in communication with the bore 20, while the bore 5 also communicated with the bore 20 by passing therethrough. A cylindrical plunger 25 is adapted for snug slidable movement within the bore 20 and is provided at its lower end with a circumferential flange 26, the perimeter of which is snugly engageable of the enlarged opening 21. Extending inwardly from the flanged end of the plunger, the transverse bore 27 is formed, and registerable with the air supply bore 5. The pin 28 projects into the vertical groove in the wall of the nozzle 1 at the bore 20 for the obvious purpose of preventing the rotation of the plunger 25 in its movement in the bore 20. The outer end of the plunger 25 is provided with a head 29, to facilitate the actuation of the plunger by the person operating the same. An upstanding shell 30 is formed around the plunger and in spaced relation thereto in the manner shown in Figure 6 to protect the plunger from being bent or otherwise distorted during rugged use. An elongated groove 31 is formed longitudinally in the plunger and at its intermediate portion, said groove being substantially arcuate in longitudinal extent.

In the operation of this nozzle, the operator of the same engages the head thereof over the usual pneumatic tube valve, so that the projecting end portion of the valve stem 11 will engage the valved element of the pneumatic tube, whereby both valves will be opened. This will result in the inflating of the tire tube to a point where the operator believes his tire to be sufficiently inflated. At this point, the operator ordinarily must disengage the nozzle for the purpose of attaching the tire by one of the conventional tire gauges now being used.

With the present device at hand, the operator simply depresses the plunger 25, which results in the closure of the duct 5 and allowing the back pressure from the tire to flow through the channel 31 and into the duct 18. Obviously, the pressure of the air will register on the gauge 16, which can be noted by the operator through the window 15. If the pressure within the tube is sufficient, the nozzle is detached therefrom, and by releasing the plunger 25, the same will assume the original position shown in Figure 6. In this original position, the air remaining in the gauge exhausts through the exposed upper end of the channel 31. The plug 22 may be adjusted in respect to the coiled spring 24, for regulating the tension of the plunger 25.

Having thus described our invention, what is claimed as new is:

A valve structure comprising a body having an opening therein, said body being provided with a bore extending through the body transversely of said opening, said body being provided with a duct extending from said bore, a valve element slidable within said bore, and provided with an actuating knob at one end thereof, said element being provided with a transverse opening, and a longitudinally extending channel, said body being provided with an enlarged counter bore threaded at its outer end and communicating with the transverse bore of the body, a head on the element operative within the enlarged bore, spring means operating against said head for normally maintaining the element projected outwardly so that the channel will open the duct to the atmosphere while the transverse opening in the element is alined with the opening thru the body, and a threaded plug for disposition within the enlarged bore adapted to be urged against the spring means to adjust the pressure thereof.

In testimony whereof we affix our signatures.

HOWARD STANLEY.
RUFUS STANLEY.